(12) United States Patent
Seippel, III et al.

(10) Patent No.: US 7,827,246 B2
(45) Date of Patent: Nov. 2, 2010

(54) DYNAMIC DOMAIN BASED ELECTRONIC MAIL SIGNATURE LINES

(75) Inventors: Alvin J. Seippel, III, Austin, TX (US); Caryn N. Seippel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 12/049,151

(22) Filed: Mar. 14, 2008

(65) Prior Publication Data

US 2009/0234925 A1 Sep. 17, 2009

(51) Int. Cl.
G06F 15/16 (2006.01)
(52) U.S. Cl. .................. 709/206; 709/205; 715/715
(58) Field of Classification Search .............. 709/206, 709/207
See application file for complete search history.

(56) References Cited

U.S. PATENT DOCUMENTS

| | | | | |
|---|---|---|---|---|
| 7,617,284 | B2 * | 11/2009 | Salamuniccar | 709/206 |
| 7,693,945 | B1 * | 4/2010 | Dulitz et al. | 709/206 |
| 2002/0010745 | A1 * | 1/2002 | Schneider | 709/206 |
| 2003/0009529 | A1 * | 1/2003 | Powers | 709/206 |
| 2003/0110227 | A1 * | 6/2003 | O'Hagan | 709/206 |
| 2003/0217259 | A1 * | 11/2003 | Wong et al. | 713/153 |
| 2004/0010395 | A1 * | 1/2004 | Bando et al. | 702/188 |
| 2004/0139451 | A1 * | 7/2004 | Hope et al. | 719/318 |
| 2004/0211834 | A1 * | 10/2004 | Fleckenstein et al. | 235/385 |
| 2005/0055627 | A1 * | 3/2005 | Lloyd et al. | 715/505 |
| 2005/0198170 | A1 * | 9/2005 | LeMay et al. | 709/206 |
| 2005/0235041 | A1 * | 10/2005 | Salamuniccar | 709/206 |
| 2006/0031315 | A1 | 2/2006 | Fenton et al. | |
| 2006/0190734 | A1 * | 8/2006 | Spitz | 713/176 |
| 2006/0212522 | A1 * | 9/2006 | Walter et al. | 709/206 |
| 2007/0064952 | A1 * | 3/2007 | Takada et al. | 380/286 |
| 2007/0220591 | A1 * | 9/2007 | Damodaran et al. | 726/4 |
| 2007/0244973 | A1 * | 10/2007 | Pearson | 709/206 |
| 2007/0271372 | A1 * | 11/2007 | Deninger et al. | 709/224 |
| 2008/0040435 | A1 * | 2/2008 | Buschi et al. | 709/206 |
| 2008/0046592 | A1 * | 2/2008 | Gilhuly et al. | 709/239 |
| 2008/0208984 | A1 * | 8/2008 | Rosenberg et al. | 709/206 |
| 2008/0209208 | A1 * | 8/2008 | Parkinson | 713/156 |
| 2008/0263086 | A1 * | 10/2008 | Klemba et al. | 707/103 R |

(Continued)

OTHER PUBLICATIONS

"Free software download from Mindmaker increases computer ease-of-use; with MouseAssist computer users teach their PC mouse new tricks", M2 Presswire, p NA, May 15, 2000.

*Primary Examiner*—Bunjob Jaroenchonwanit
(74) *Attorney, Agent, or Firm*—Cahn & Samuels LLP

(57) ABSTRACT

A method for automatically choosing an electronic correspondence signature line, having an electronic search agent for scanning electronic correspondence for the designated destination address of the electronic correspondence, and retrieving at least one designated destination address for the electronic correspondence. The method also includes determining a domain name associated with the at least one designated destination address for the electronic correspondence retrieved by the electronic search agent and comparing the domain name for the at least one destination address with a predetermined list of domain names. The method also includes selecting at least one signature line for the electronic correspondence from a plurality of signature lines, based on the at least one domain name associated with the designated destination address of said electronic correspondence and attaching the at least one selected signature line to the electronic correspondence designated for the destination address.

6 Claims, 2 Drawing Sheets

U.S. PATENT DOCUMENTS

| | | | |
|---|---|---|---|
| 2008/0307059 A1* | 12/2008 | Ono | 709/206 |
| 2009/0031033 A1* | 1/2009 | Deng et al. | 709/229 |
| 2009/0044013 A1* | 2/2009 | Zhu et al. | 713/170 |
| 2009/0125596 A1* | 5/2009 | Naick et al. | 709/206 |
| 2009/0150488 A1* | 6/2009 | Martin-Cocher et al. | 709/204 |
| 2009/0210500 A1* | 8/2009 | Brillhart et al. | 709/206 |

* cited by examiner

DYNAMIC DOMAIN BASED ELECTRONIC MAIL SIGNATURE LINES

I. FIELD OF THE INVENTION

This invention relates to a method for dynamically choosing between a plurality of electronic signatures lines for electronic correspondence base on the domain name of the designated recipient.

II. BACKGROUND OF THE INVENTION

Many electronic mail programs allow a user to set a signature line that is automatically added at the bottom of the e-mail before it is sent. The content of these signature lines often include information such as the sender's contact information in the form of phone numbers, tie lines, email addresses or etc. The signature lines may also include other information such as the sender's job title, physical address or privacy policies regarding to content of the particular correspondence.

Traditionally, to alter the signature line a user must access some type of setup menu in the e-mail program and manually alter the signature line. The use of a particular signature line may be required or otherwise appropriate depending on the destination of the e-mail or the content of the e-mail.

If an e-mal program has provisions for a user to select from a group of signature lines, the user must still access some type of setup menu and manually select the desired signature line. This process is generally inefficient and time consuming. When an e-mail designates multiple recipients, the use of a particular signature for a particular recipient becomes very time consuming, as the particular recipient signature line the user wishes to use for a designated recipient must be manually associated with a particular e-mail or group of e-mails.

III. SUMMARY OF THE INVENTION

Disclosed are methods, systems and apparatus for automatically choosing an electronic correspondence signature line, having an electronic search agent for scanning electronic correspondence for the designated destination address of the electronic correspondence, and retrieving at least one designated destination address for the electronic correspondence. The method also includes determining a domain name associated with the at least one designated destination address for the electronic correspondence retrieved by the electronic search agent and comparing the domain name for the at least one destination address with a predetermined list of domain names. The method also includes selecting at least one signature line for the electronic correspondence from a plurality of signature lines, based on the at least one domain name associated with the designated destination address of said electronic correspondence and attaching the at least one selected signature line to the electronic correspondence designated for the destination address.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the method should become evident to a person of ordinary skill in the art.

IV. BRIEF DESCRIPTION OF THE DRAWING

In order to describe the manner in which the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

V. DETAILED DESCRIPTION

Various embodiments are discussed in detail below. While specific implementations of the disclosed technology are discussed, it should be understood that this is done for purposes of illustration. A person skilled in the relevant art will recognize that other components and configurations may be used without departing from the spirit and scope of the invention.

Figure 1:
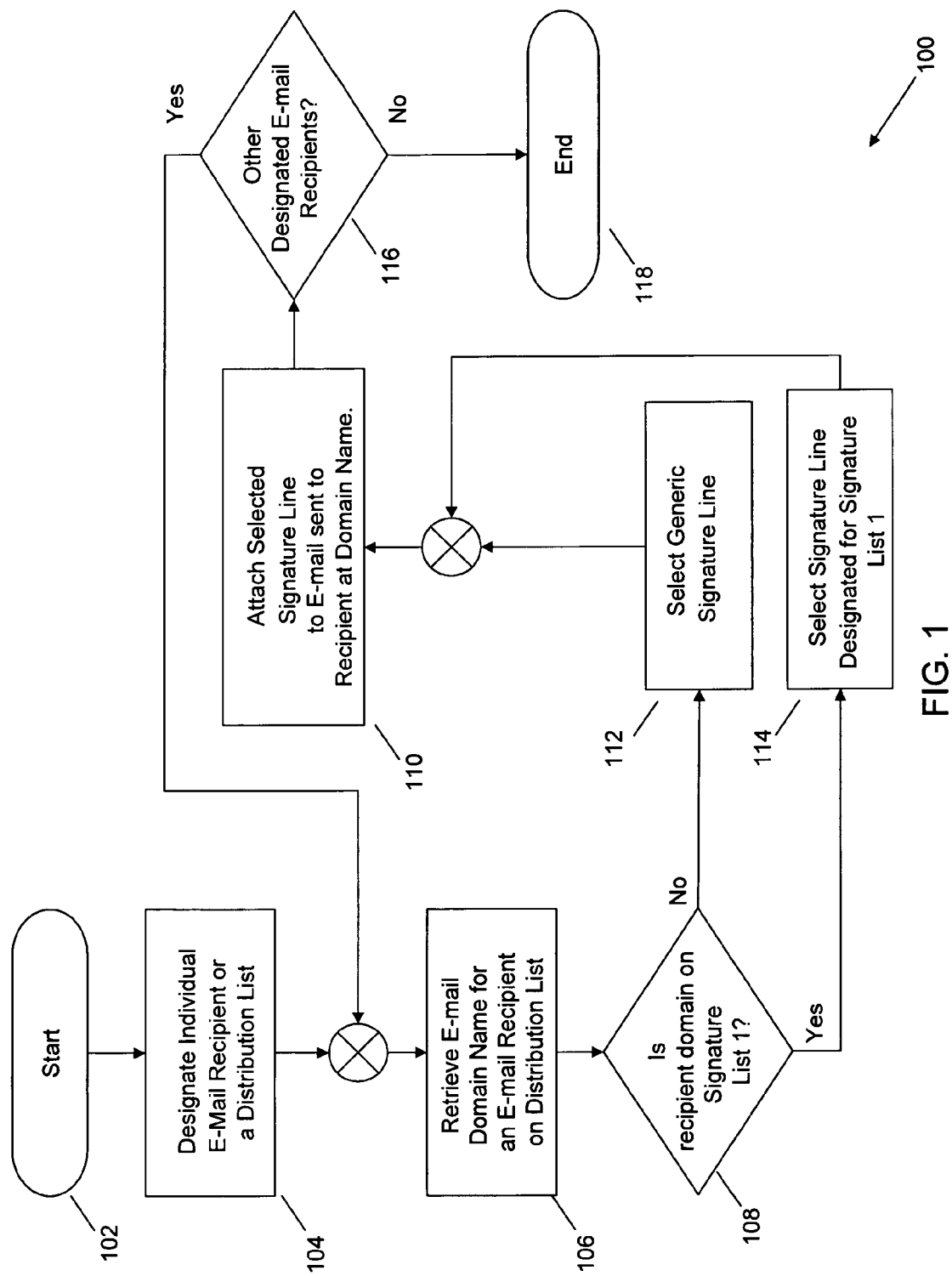
FIG. 1 illustrates an exemplarily flow chart for dynamically choosing between two electronic signatures lines for electronic correspondence based on the domain name of the designated e-mail recipient.

Referring to the Figures, wherein like elements are denoted by like find numbers, FIG. 1, shows an exemplarily flowchart 100 for dynamically choosing between two electronic signatures lines for electronic correspondence based on the domain name of the designated e-mail recipient in accordance with the disclosed invention.

Preferably, the system for selecting dynamically selecting a signature line is initiated when a user designates an individual e-mail recipient 104. When the individual e-mail recipient is designated, a search agent retrieves the e-mail domain name for the designated e-mail recipient 106. The e-mail domain name for the designated recipient is compared to at least one predefined list of e-mail domains associated with a particular electronic signature. A user may designate one e-mail signature line for internal e-mails, and another e-mails signature line for e-mail recipients external to an organization. For example, a user may designate an e-mail signature including only internal contact information for all e-mails to a recipient e-mail domain of "XXX@ibm.us.com", and designate a different signature line for all other recipient e-mail domains, "XXX@howard.edu", "XXX@grambling.edu", "XXX@southern.edu" or "XXX@engineer.com."

If the system determines that the recipient domain is on a particular signature list 108, for example signature list 1, the system selects the signature line associated with that particular signature list 114. The selected signature line is then automatically attached to the e-mail sent to the recipient at the retrieved domain name 110.

If the recipient domain is not associated with a particular signature list, the system will apply and attach a second or generic signature line to the e-mail associated with the unrecognized domain name. In other embodiments, the system may apply and attach no electronic signature line at all to unrecognized domain names. The e-mail signature decisions are governed by predetermined parameters, designated when the user creates the e-mail signature line and are automatically applied upon the designation of an e-mail recipient.

In yet another embodiment, the user designates a plurality of e-mail recipients or an e-mails distribution lists rather than an individual e-mail recipient. With continued reference to FIG. 1, in this embodiment, the search agent individually retrieves each domain name associated with an individual e-mail recipient 106 and determines whether or not the recipient domain is on a predetermined signature list 108 as in the single recipient embodiment. If the domain name is on a predetermined e-mail signature list 114, the signature line associated with the signature list is attached to the e-mail and designated for the recognized domain 110.

If the domain name is unrecognized, does not appear on the predetermined signature list, a generic signature line is selected 112 and attached or applied to the mail designated for the unrecognized domain 110. The system then determines if there are other e-mail recipients 116, and if other recipients are designated employs the search agent to retrieve the next e-mail domain name from the distribution list 106. The retrieved e-mail domain is compared to the predetermined e-mail signature list 108, and the appropriate signature line is applied and attached, 112, 114, 110. This process continues until each e-mail domain name on the distribution list has been retrieved, evaluated and associated with an appropriate signature line.

Figure 2:
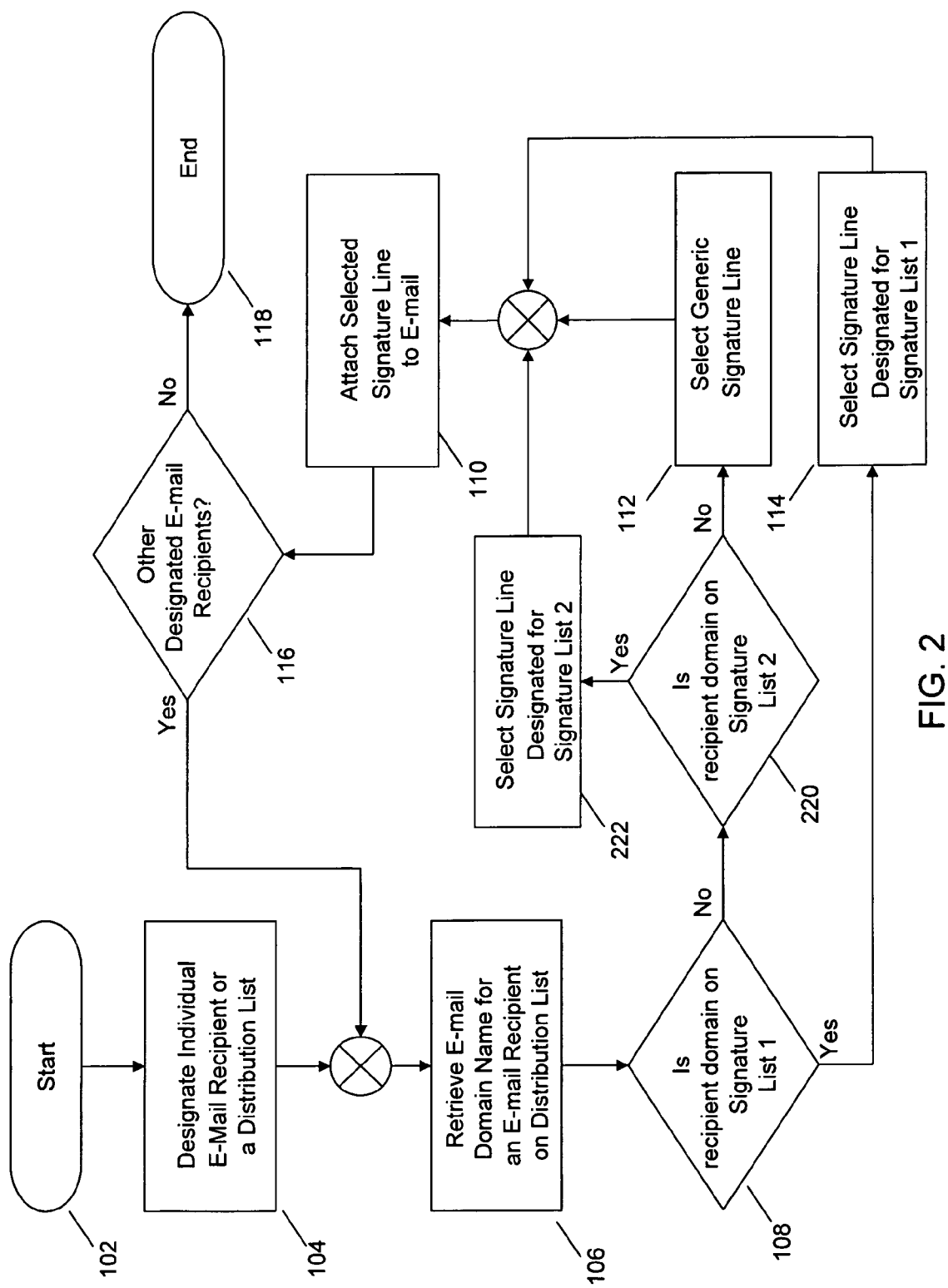
FIG. 2 illustrates an exemplarily flow chart for dynamically choosing between three electronic signatures lines for electronic correspondence based on the domain name of the designated e-mail recipient.

In yet another example embodiment the system may employ a plurality of designated signature list each associated with at least one set, class or family of domain names. Referring now to FIG. 2 which shows an exemplarily flow chart for dynamically choosing between three electronic signatures lines for electronic correspondence based on the domain name of the designated e-mail recipient.

Similar to the embodiments discussed regarding FIG. 1, when a user designates an e-mail recipient or a distribution list, a search agent retrieves the designated recipient e-mail domain 106 and compares the retrieved recipient domain with a list of domains associated with a particular signature line 108, signature list 1. The signature list may be determined or otherwise created by parameters previously set by the user. If the domain name appears on or otherwise meets the parameters of signature list 1, the e-mail signature line associated with that list will be attached to the e-mail to that particular e-mail recipient 110. If the domain name does not meet the requirements of signature list 1, the system will retrieve the next e-mail signature list, signature list 2 and determine if the domain name meets the requirements of the second signature list 220. If the domain name appears on or otherwise meets the parameters of signature list 2, the e-mail signature line associated with that list will be selected 222 and ultimately attached 110 to the e-mail to that particular e-mail recipient. If a third signature list exist and the selected domain does not appear on the first or second lists, the system will check the signature list associated with the third signature line for a match. This process will continue until a signature line is associated with the domain name or all of the e-mail signature options are exhausted. A default e-mail signature may be used if no designated signature line from the lists is associated with the domain name.

When the e-mail signature line is associated with the domain name, the system determines if other e-mail recipients are designated to receive the e-mail 116. If other e-mail recipients are designated the search agent will retrieve the next domain name 106 and the process is repeated until each designated e-mail recipient has a signature line attached.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

In yet another example embodiment the invention resides in a computer program product comprising computer usable medium having a computer-usable program code for automatically choosing an electronic correspondence signature line, having an electronic search agent for scanning electronic correspondence for the designated destination address of the electronic correspondence, and computer-usable program code for retrieving at least one designated destination address for the electronic correspondence. The computer program product also features computer usable program code for determining a domain name associated with the at least one designated destination address for the electronic correspondence retrieved by the electronic search agent and computer usable program code for comparing the domain name for the at least one destination address with a predetermined list of domain names. The computer program product also features computer usable program code for selecting at least one signature line for the electronic correspondence from a plurality of signature lines, based on the at least one domain name associated with the designated destination address of said electronic correspondence and computer usable program code for attaching the at least one selected signature line to the electronic correspondence designated for the destination address.

The disclosed invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in a variety of computer programming languages. The program code may be executed entirely on at least one computing device, as a stand-alone software package, or it may be executed partly on one computing device and partly on a remote computer. In the latter scenario, the remote computer may be connected directly to the one computing device via a LAN or a WAN (for example, Intranet), or the connection may be made indirectly through an external computer (for example, through the Internet, a secure network, a sneaker net, or some combination of these).

It will be understood that each block of the flowchart illustrations and block diagrams and combinations of those blocks can be implemented by computer program instructions and/or means. These computer program instructions may be provided to a processor of at least one general purpose computer, special purpose computer(s), or other programmable data processing apparatus to produce a machine, such that the instructions, which execute via the processor of the computer or other programmable data processing apparatus, create means for implementing the functions specified in the flowcharts or block diagrams.

The exemplary and alternative embodiments described above may be combined in a variety of ways with each other. Furthermore, the steps and number of the various steps illustrated in the figures may be adjusted from that shown.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

The invention claimed is:

1. A method for automatically choosing an electronic correspondence signature line on a computer, said method comprising:
   an electronic search agent said electronic search agent,
      scanning said electronic correspondence on a computer for the designated destination address of said electronic correspondence, and
      retrieving at least one designated destination address for said electronic correspondence;
   determining a domain name associated with said at least one designated destination address for said electronic correspondence retrieved by said electronic search agent;
   comparing on a computer said domain name for said at least one destination address with a predetermined list of domain names;
   selecting on a computer at least one signature line for said electronic correspondence from a plurality of signature lines, based on said at least one domain name associated with said designated destination address of said electronic correspondence;
   attaching on a computer said at least one selected signature line to said electronic correspondence designated for said destination address.

2. The method for automatically choosing an electronic correspondence signature line on a computer of claim 1 further comprising:
   associating a domain name for at least one destination address with a set, class or family of domain names;
      selecting on a computer a signature line for said electronic correspondence from a plurality of signature lines, based on said set, class or family of domain names associated with said designated destination address of said electronic correspondence;
      attaching said selected signature line to said electronic correspondence designated for said destination address.

3. The method for automatically choosing an electronic correspondence signature line on a computer of claim 1 further comprising:
   determining if said recipient domain name meets a set of requirements for a first signature list, and if said recipient domain name meets the requirements of said first signature list, attaching the signature line associated with said first signature list to the e-mail to that particular e-mail recipient; and,
   retrieving on a computer a second signature list, if said recipient domain name does not meet the requirements of said first signature list.

4. The method for automatically choosing an electronic correspondence signature line of claim 3 further comprising:
   determining if said domain name meets a set of requirements for a second signature list, and if said recipient domain name meets the requirements of said second signature list, attaching the signature line associated with said second signature list to the e-mail to that particular e-mail recipient; and,
   retrieving on a computer a next e-mail signature list, if said recipient domain name does not meet the requirements of said second signature list.

5. The method for automatically choosing an electronic correspondence signature line on a computer of claim 4 further comprising:
   determining if said recipient domain name meets the requirements of a next signature list, and if said recipient domain name meets the parameters of said next signature list, attaching the signature line associated with said next signature list to the e-mail to that particular e-mail recipient.

6. The method for automatically choosing an electronic correspondence signature line on a computer of claim 5 further comprising:
   Selecting on a computer a default e-mail signature and, attaching said default signature line to the e-mail to a particular e-mail recipient if said recipient domain name does not meet the requirements of any designated signature list.

* * * * *